May 5, 1931.  A. BASOLA ET AL  1,803,888
DIE NUT
Filed Sept. 5, 1928
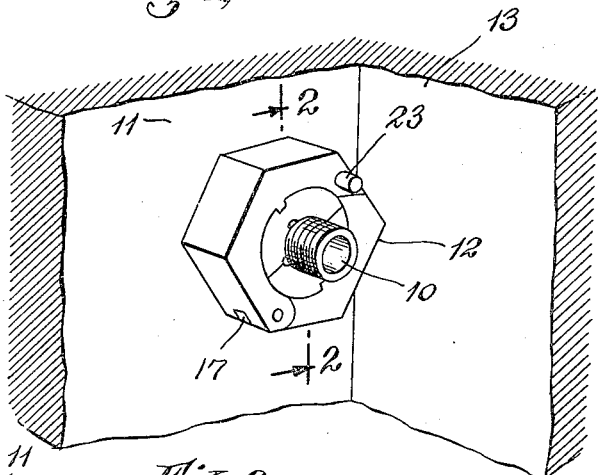
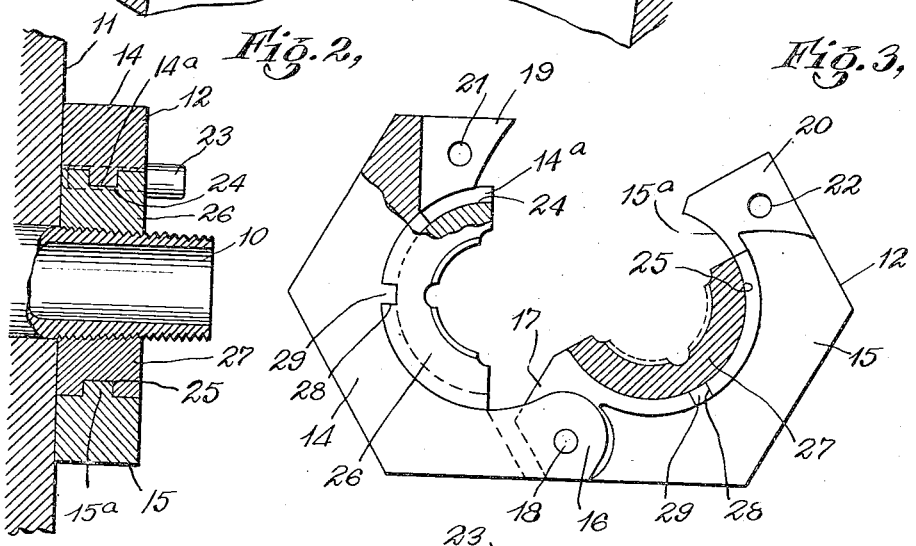
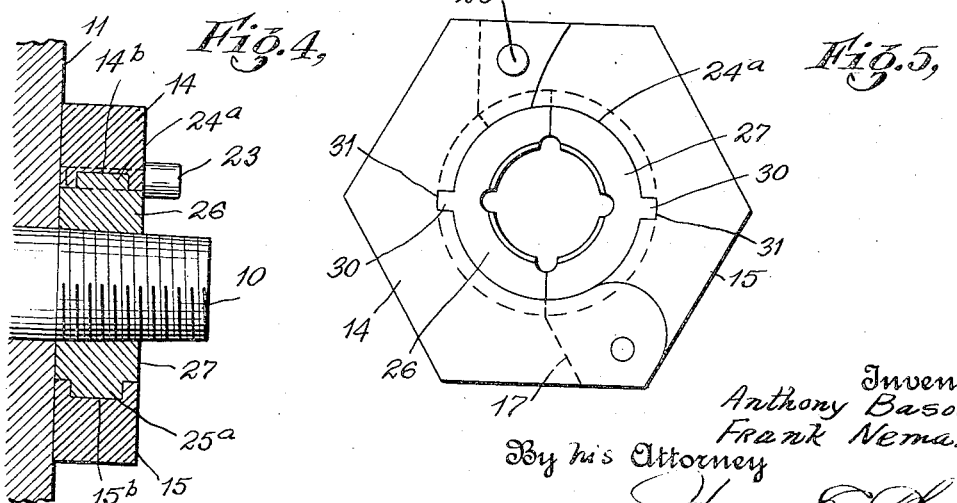
Inventors
Anthony Basola
Frank Nemarnick
By his Attorney
Howard E. Thompson Patented May 5, 1931

1,803,888

UNITED STATES PATENT OFFICE

ANTHONY BASOLA AND FRANK NEMARNICK, OF LONG ISLAND CITY, NEW YORK

DIE NUT

Application filed September 5, 1928. Serial No. 304,086.

This invention relates to thread cutting dies; and the object of the invention is to provide a thread cutting device, the exterior or body portion of which is of angular or nut formation, preferably hexagonal in form which will facilitate the operation of the device in restricted areas or corners, thus facilitating the thread cutting operation in a quick, simple and efficient manner; a further object being to provide a device of the class specified employing two body portions pivotally coupled at one side and adapted to be detachably coupled at the opposite side with means for supporting the separate arc-shaped die parts in the body parts and to key and retain said die parts against displacement from the body parts; a still further object being to provide a device of the class described in which the entire structure is contained within the outer wall boundaries of the angular or nut-like body portion employed; and with these and other objects in view, the invention consists in a device of the class described which is simple in construction, efficient in use, and which is constructed as hereinafter described and claimed.

The invention is fully disclosed in the following specification, of which the accompanying drawings forms a part, in which the separate parts of my improvement are designated by suitable reference characters in each of the views, and in which:—

Fig. 1 is a perspective view of my thread cutting device illustrating one method of its use.

Fig. 2 is a section on the line 2—2 of Fig. 1.

Fig. 3 is a plan and sectional view of the device shown in Figs. 1 and 2, with parts in a separated position.

Fig. 4 is a view similar to Fig. 2 showing a modification; and,

Fig. 5 is a plan view of the modified structure shown in Fig. 4.

While our improved device may be used as a thread cutting device, generally speaking, it is adapted primarily for use in cutting or recutting threads in making repairs on apparatus of various kinds and classes, for threading sections of pipes, rods or the like, and has for one of its principal uses, the rethreading or recutting of threads in pipes, rods or tubes of boilers, furnaces and the like wherein it is essential to remove an old or distorted nut from a burned out, rusted and sometimes warped rod or tube. In such cases, the old nut is removed by a chisel or similar tool if it cannot be removed by means of a wrench, and one of my improved die nuts or thread cutting devices is placed upon the inner end of the tube, for example the tube 10 as seen in Figs. 1 and 2, adjacent a wall member or support 11, and is rotated by a wrench fitting the hexagonal formation of the main body 12 of one of my improved devices or at least opposite walls thereof to advance the same outwardly with respect to the wall 11 to recut the threads in the pipe 10, facilitating the placement of a new nut thereon and the drawing of said nut snugly upon the surface of the wall 11. As previously stated, it will also be apparent that the pipe 10 may be unthreaded and the threading device applied thereto to cut the threads in the usual manner.

As above stated, our improved device is designed particularly for use in restricted areas where threading devices of conventional form, involving swinging arms, rods or levers projecting radially from the thread cutting device cannot be moved or operated. To illustrate this use of the invention, we have shown in Fig. 1 of the drawings, a wall 13 arranged adjacent one side of the pipe 10 and disposed at right angles with reference to the wall 11. It will thus be seen that a wrench may be readily used for rotating the threading device 12, and this wrench may be of a socket or other type.

In carrying our invention into effect as seen in Figs. 1 to 3 inclusive, the body 12 consists of two parts 14 and 15 of such peripheral form that when said parts are assembled, a hexagonal nut-like body 12 is the result. The part 14 has at one end two projecting ears 16 to receive an intermediate tongue 17 on the part 15 forming a hinge or pivot structure, the pin of which is shown at 18 whereby the parts 14 and 15 are movably coupled. The other side of the part 14 is provided with another pair of ears 19 adapted to receive a tongue 20 on the other end of the part 15. The ears 19 are apertured as seen at 21 and the tongue 20 is apertured as seen at 22, both apertures registering when the last named ends of said parts are brought together to receive a key pin or coupling member 23 which secures the separate parts 14 and 15 together in a closed position.

The inner and adjacent faces of the parts 14 and 15 are arc-shaped or semi-circular in form and provided with central ribs 14a and 15a which are directed inwardly and radially and are adapted to enter corresponding grooves 24 and 25 in the separate semi-circular parts 26 and 27 of the thread cutting die employed.

The side walls of the dies 26 and 27 are provided centrally with recesses 28 adapted to receive inwardly projecting key members 29 arranged centrally on opposite sides of the body parts 14 and 15, keying the die parts 26 and 27 against rotation in the parts 14 and 15. It will be understood that when the parts 14 and 15 are coupled together as seen in Fig. 1 of the drawings, the adjacent ends of the die parts 26 and 27 are brought into abutting relation forming the complete annulus of the thread cutting die.

In Figs. 4 and 5 of the drawings, we have shown a modification which consists simply in reversing the interengaging and interlocking elements employed between the parts 14', 15', 26 and 27. In said figures, instead of providing the grooves 24 and 25 in the die parts 26 and 27, said die parts are provided with outwardly projecting ribs 24a and 25a which enter grooves 14b and 15b in the parts 14' and 15' which take the place of the ribs 14a and 15a. Instead of providing the projecting key 29 on the parts 14' and 15', as in Fig. 3, the parts 26 and 27 are provided with outwardly projecting key members 30 entering corresponding recesses 31 in the parts 14' and 15' as seen in Fig. 5.

Aside from the foregoing, the construction of the thread cutting device shown in Figs. 4 and 5 is identical with that shown in Figs. 1 to 3 inclusive, and in both forms of construction, it will be noted that the side walls of the die parts 26 and 27 are in line with or contained within the boundaries of the side walls of the body 12 or the separate parts 14' and 15' thereof. The pin 23 may be applied from either side of the body 12, permitting of the use of the nut with either side face adjacent a workpiece or support.

It will be apparent that one body part 12 may be used for dies of numerous sizes within practical limits, thus necessitating the manufacture of but a comparatively few die supporting bodies 12 of such conventional and standard sizes as to adapt the same for use in connection with thread cutting dies, meeting all standards and even special requirements.

It will be understood that while we have shown certain details of construction for carrying our invention into effect, that we are not necessarily limited to these details, and various changes therein and modifications thereof may be made within the scope of the appended claims without departing from the spirit of our invention or sacrificing its advantages.

Having fully described our invention, what we claim as new and desire to secure by Letters Patent, is:

1. A screw threading tool for cutting screw threads in an intermediate portion of a bolt or the like and for use in restricted places by operation of an ordinary wrench and comprising a nut member made up of hingedly connected parts having the external configuration of a hexagonal nut and having a circular interior, a circular thread cutting die member in cooperating separable segments to fit the circular interior of the nut member, the separable parts of said nut member and the separable parts of said die member having centrally disposed interfitting annular ribs and grooves, and keys and key receiving grooves transversely intersecting the annular ribs and grooves for removably holding the separable die parts in definitely positioned relation within the nut parts.

2. A screw threading tool for cutting screw threads in an intermediate portion of a bolt or the like and for use in restricted places by operation of an ordinary wrench and comprising a nut member made up of hingedly connected parts having the external configuration of a non-circular nut, a die member composed of separable parts removably seated within the parts of the nut member, the parts of said die member having an annular groove about the same intersected by keyways and the parts of the nut member having an intermediate annular rib and transverse keys to fit the grooves and keyways of the die parts, end portions of the positioning rib being extended and providing lugs for hingedly connecting the parts of the nut member together.

In testimony that we claim the foregoing as our invention we have signed our names this 25th day of August, 1928.

ANTHONY BASOLA.
FRANK NEMARNICK.